Figure 1:
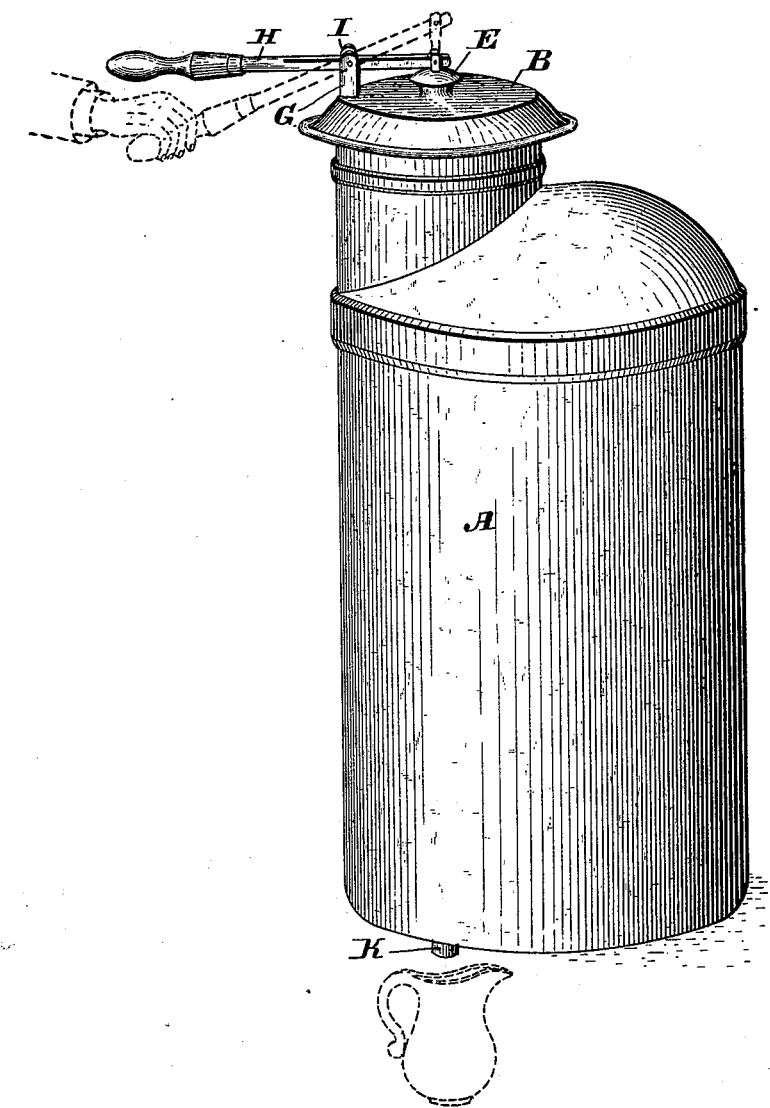

(No Model.) 2 Sheets—Sheet 1.
H. P. & S. L. BARNHART.
LIQUID TRANSPORTING AND MEASURING VESSEL.

No. 404,819. Patented June 11, 1889.

ATTEST.
J. Henny Kaiser.
Chas. E. Hunt.

INVENTOR.
Harry Patton Barnhart
Samuel Linday Barnhart (No Model.) 2 Sheets—Sheet 2.
H. P. & S. L. BARNHART.
LIQUID TRANSPORTING AND MEASURING VESSEL.
No. 404,819. Patented June 11, 1889.
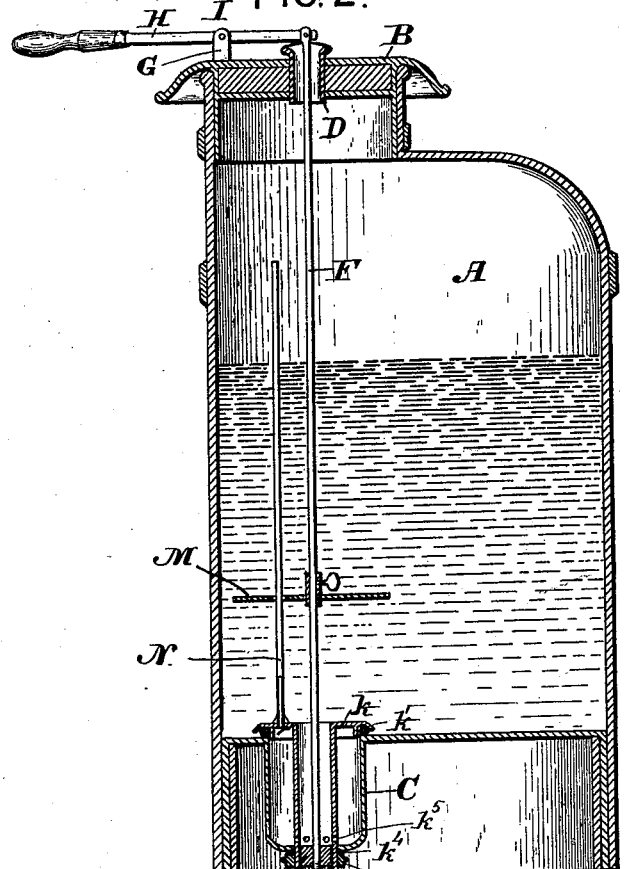
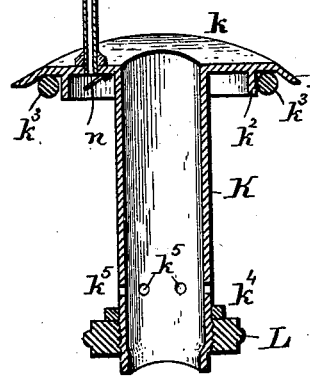
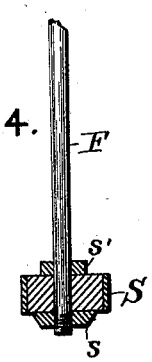
ATTEST.
J. Henry Kaiser.
Chas. E. Hunt.
INVENTOR.
Harvey Patten Barnhart
Samuel Linsley Barnhart

UNITED STATES PATENT OFFICE.

HARVEY PATTEN BARNHART AND SAMUEL LINDSEY BARNHART, OF POTSDAM, NEW YORK.

LIQUID TRANSPORTING AND MEASURING VESSEL.

SPECIFICATION forming part of Letters Patent No. 404,819, dated June 11, 1889.

Application filed February 6, 1889. Serial No. 298,846. (No model.)

*To all whom it may concern:*

Be it known that we, HARVEY PATTEN BARNHART and SAMUEL LINDSEY BARNHART, citizens of the United States, residing at Potsdam, in the county of St. Lawrence and State of New York, have invented certain new and useful Improvements in Liquid Transporting and Measuring Vessels, of which the following is a specification.

Our invention relates particularly to that class of liquid transporting and measuring vessels in which milk is delivered to customers, and it is an important object of our improvement to make it practically impossible for the vender not to deliver in every measure of milk drawn by him a uniform and normal amount of cream, even though the quantity of milk in the can be very large; and it is a further design of our improvement to provide means whereby the vender shall obtain a positively uniform and accurate measure with increased rapidity and without waste.

To this end our invention consists in the apparatus hereinafter described, and illustrated in the accompanying drawings, wherein like characters indicate similar parts in the several views, and in which—

Figure 1 is a perspective view of a vessel employing our improvements. Fig. 2 is a central vertical section of the same, and Figs. 3 and 4 are details.

It is well known that the delicate flavor of milk is easily affected by atmospheric changes, and that its composition is of such a character that it readily offers itself as a vehicle for the transmission of noxious and disease-breeding germs. To be safely carried from house to house and from street to street it must be practically sealed from all contact with the atmosphere; and because of this excessive liability of milk to contract disease-germs and grow tainted and sour with even the slightest and briefest contact with impurity, every vessel intended for its manipulation or storage must be constructed with special adaptation to being taken apart, so that all the surfaces may be thoroughly cleansed and purified. Complicated devices for measuring and delivering milk, open more or less to the objections above pointed out, have been heretofore proposed; but they have not, for obvious reasons, been successful.

Our improvement is simple and certain in its operation, is not liable to get out of order, and is easily taken apart, cleansed, and readjusted.

A is a storage can or tank for containing and transporting milk in bulk. The cover B is removable from the opening in the top of the can. This opening is of such size as to permit the admission of the hand and arm for cleansing the inner surface of the can, as well as to permit the removal and readjustment of the measuring devices. This cover has a short nozzle or sleeve D located centrally in its body. Its upper extremity is flanged or bell-shaped to afford a convenient means for attaching an elastic diaphragm or rubber disk E, through a central opening in which the piston-rod F passes for the purpose of excluding dust and odors from the contents of the can or tank. This piston-rod carries at its lower extremity a piston S and at its upper extremity engages with the handled lever H, which is fulcrumed within the U-shaped rest G, and kept within its seat by a key or pin I.

We provide for suitable play of the parts by making a slot in the end of the handle-lever, which engages with a corresponding pin in the extremity of the piston-rod. A link might also be employed for the same purpose.

Within the hollow bottom of the can is fixed the measuring-chamber C, its upper periphery passing into and being flush with the bottom of the vessel, while its own open bottom is slightly above the lowermost rim, upon which the can rests, as shown in Fig. 2. Within the measuring-chamber, which may be of any desirable size, such as a quart or a half-gallon or a gallon, is fixed the cylinder or tube K, open at both ends, as shown in Fig. 3. To the upper end of the cylinder K is secured in any suitable way the covering cap or flange $k$, projecting outward, and having at its periphery the downwardly-bent marginal edge $k'$, and upon its under surface the right-angular flange $k^2$. Between these two converging surfaces is placed the packing-ring $k^3$. The disposition of these two surfaces is such that when the cylinder is set in the measure C the flange $k^2$ sets just within the wall of the measuring-chamber, while the bent marginal edge $k'$ extends beyond the junction of this end wall with the can-bottom.

The lower end of the cylinder K is slightly contracted, as shown in Fig. 3, to pass readily through the cylindrical opening in the bottom of the measure C, and to form the outlet-opening thereof, as well as the shouldered seat upon which the piston S rests. Just above its contracted end and upon its outside is screwed a thumb-nut L. Directly above the thumb-nut L is seated another packing-ring $k^4$. Within the tube K, at a distance above the packing-ring $k^4$ slightly greater than the thickness of the wall of the measure C, are a series of openings or slots $k^5$.

The parts being as herein described, the cylinder K is set within the measure C, its cover $k$ resting upon the packing-ring $k^3$, which rests in turn upon the can-bottom. The tube-bottom is passed through the opening in the bottom of the measure, the packing-ring $k^4$ is slid over its contracted extremity outside the measure, and the thumb-nut L is screwed up, drawing the two packing-rings into firm engagement with the top and bottom portions, respectively, of the measure C. The piston-rod F is now inserted within the cylinder K, carrying the piston S, until the same makes close engagement with its seat at the contracted portion of the tube. This piston is preferably a block of rubber carried upon the piston-rod at its extremity between a pair of washers or nuts $s$ $s'$, having threaded engagement with the end of the piston-rod. To the piston-rod, at some distance above the measure, is secured the circular plate M, whereby with each motion of the piston-rod up and down within the can the contents thereof are thoroughly and uniformly agitated and the cream is kept from rising to the top of the milk. The plate is adjustably secured by means of a common sleeve and set-screw fastening, whereby the same may be fixed to correspond with the contents of the can.

N is an air-tube or inlet-pipe fixed within the top of the covering-cap $k$, having a float-valve $n$ at the under side of its opening into the measure. The length of the tube is sufficient to carry its upper end into the air-chamber above the normal level of the milk when the vessel is full.

The operation of our device is briefly as follows: When the parts have been properly assembled and the vessel charged with its quantity of milk, the piston having been firmly seated against the shoulder in the tube K, bringing the same below the line of perforations $k^5$, the milk readily flows into the measure through the said perforations until the same is full, the air being driven out by the fluid until the measure is full and the valve closed. The handle-lever now being depressed, the piston-rod is lifted, the piston rises above the line of perforations, and the contents of the measure are at once discharged through the perforations and from the outlet, the valve $n$ dropping readily to admit air to the chamber as the contents pass out. The piston being lowered again to its seat, the measure at once is refilled and is ready for delivering to the next customer. It will thus be seen that we have provided an outfit containing the maximum of security against contact with objectionable matters, as well as a minimum of simplicity. The parts are all readily detachable for cleansing purposes. They are easily and quickly reassembled. Not the least advantageous feature of the apparatus is that of the agitator-plate M, which keeps the cream thoroughly and uniformly distributed throughout the mass of milk.

Having now fully ascertained and pointed out the nature of our invention and the best means for carrying the same into effect, what we claim, and desire to secure by Letters Patent of the United States, is—

1. The combination, with the closed carrying and containing vessel A, having the open-bottomed measuring-chamber C, of the piston S, the detachable cylinder K, and means for operatively closing the joints between the cylinder and the measuring-chamber, whereby the said chamber is adapted to be filled and emptied, as set forth.

2. The cylinder K, in combination with the measuring-vessel C, the latter open at top and bottom and the former having the covering-cap $k$ at its upper extremity, the contracted lower end thereof being provided with a thumb-nut, and means for packing the top and bottom openings of the measuring-chambers, as set forth.

3. The carrying and containing vessel A, having the measuring devices described, comprising the cylinder K, the piston S, and chamber C, in combination with the agitator M, fixed to the piston-rod, whereby the operation of discharging the contents of the vessel simultaneously agitates and thoroughly incorporates the constituent parts of the same, as set forth.

4. The closed vessel A, having the open-bottomed measuring-chamber C, the cylinder K, seated therein and provided with perforations $k^5$, and the sliding piston S, in combination with the air-inlet pipe N and float-valve $n$, connecting the said measure-chamber with the air-space in the top of the said closed vessel, as set forth.

HARVEY PATTEN BARNHART.
  SAMUEL LINDSEY BARNHART.

Witnesses:
  C. E. SANFORD,
  HENRY S. WILSON.